Patented Mar. 5, 1946

2,396,051

UNITED STATES PATENT OFFICE 2,396,051

COATING COMPOSITIONS

André N. Laus, Newton, Mass., assignor to Monsanto Chemical Company, St. Louis, Mo., a corporation of Delaware No Drawing. Application March 7, 1942,
Serial No. 433,733

18 Claims. (Cl. 106—287)

This invention relates to liquid coating compositions, and more particularly to coating compositions, such as varnishes, lacquers, synthetic resin coatings, and the like which contain substances capable of reducing the gloss of the films formed therefrom.

Gloss reducing or flatting agents which have been used in the past include such substances as diatomaceous earth, clay, magnesia, magnesium carbonate, asbestine and the like. These materials, however, do not have a very high flatting efficiency, and are incapable of producing films which are sufficiently dull or flat to satisfy exacting requirements, such as those of the army or navy. Moreover, they are definitely unsuited for use in nitrocellulose lacquer or like coating compositions, as they not only have a marked tendency to cake and settle in the lacquer vehicle, but cause haziness or milkiness in clear films and a change of color (shade) or color value (intensity) in pigmented films. They also have a deleterious effect on the general film properties of the lacquer, as shown by loss of tensile strength, increase in brittling and early failure in the mandrel test.

It is accordingly a primary object of the present invention to provide a flatting agent which possesses unusually high flatting efficiency in all types of liquid coating compositions.

A further object of the invention is to provide a flatting agent of the type described which does not tend to cake or settle in a lacquer vehicle.

A further object of the invention is to provide a flatting agent which may be added to clear lacquer compositions in sufficient quantity to produce pronounced flatting effects with substantially no change in the transparency of the composition.

A further object of the invention is to provide a flatting agent which may be added to pigmented lacquer compositions in sufficient amount to produce pronounced flatting effects with substantially no impairment of the color or color value of the composition.

A still further object of the invention is to provide a highly flatted lacquer composition which substantially retains the general film properties which it possessed prior to being flatted.

A still further object of the invention is to provide a flatting agent of unusual flatting efficiency which does not appreciably increase the viscosity and/or thixotropy of the coating compositions to which it is added upon being ground into or with said compositions.

A still further object of the invention is to provide a flatting agent comprising an organogel from which maximum amounts of the continuous phase can be removed without diminishing the original flatting powers of the gel.

Still further objects and advantages of the invention will appear from the following description and appended claims. Before explaining in detail the present invention, however, it is to be understood that the invention is not limited in its application to the details described herein, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The present invention is in general carried out by mixing with the coating composition to be flatter varying amounts of a gel of an inorganic oxide having an organic solvent as the liquid or continuous phase, or at least as the major portion of the continuous phase. The gels which it is proposed to use in the above manner are preferably prepared by first preparing by any suitable method an aquagel containing an inorganic oxide as the solid or disperse phase and water as the liquid or continuous phase. The water in the aquagel is then replaced or largely replaced by washing the gel one or more times with a water miscible organic solvent, such as alcohol, acetone, and the like. In these instances where a water-immiscible solvent is required as the continuous phase, it is necessary to first replace the water with a water-miscible organic solvent and then replace the latter solvent by washing the gel with the water-immiscible organic solvent. A portion at least of the organic solvent is then removed by an ordinary evaporating or drying operation.

Organogels prepared in the above manner, but with the drying step omitted, usually contain from 10 to 15% by weight of inorganic oxide, such as the oxide of silicon, aluminum, magnesium, titanium, tin, thorium, chromium, iron, nickel and the like. However, it is possible to prepare commercially by the above method gels containing prior to drying from 1 to about 20% by weight of the oxide. These undried organogels have excellent flatting powers, but are in some instances undesirable for use as such, since they markedly increase the viscosity of the coating materials to which they are added, which not only renders the grinding of the treated materials difficult, but makes it hard to apply them by spraying methods.

The partially dried gels of the present invention may be prepared from the above undried gels in any desired manner. Usually a simple drying operation is resorted to, such as tumbling in a current of dry air. However, other methods such as evaporation by heat may also be employed with equally good results. After being subjected to the drying treatment the gels contain anywhere from about 25 to 90% by weight of the oxide constituting the solid or disperse phase of the gel. Preferably, however, sufficient of the organic solvent is removed to provide a gel containing at least 40% of oxide by weight, as coating solutions or mixtures of thoroughly satisfactory viscosity characteristics, which are at the same time capable of producing highly flat films, are not always obtained, when less of the solvent is removed.

The partially dried gels obtained as above are preferably added to the coating compositions in amounts sufficient to supply from 1 to 40% of oxide based on the total solids in the final composition. If larger amounts than this are employed the resulting film is apt to be crackled or checked in appearance. The exact amount of oxide which is required in the coating composition depends upon the use which is to be made of the particular coating composition being treated. Regardless of the amount employed or the use made of the coating composition, however, the flatting efficiency of the partially dried organogels described herein is definitely superior to that of most previously known flatting agents.

It is essential that the amount of water in the continuous phase of the organogel prior to drying the same be as low as possible, as the presence of water in the gel tends to cause shrinkage during the drying and consequent loss of flatting power. However, in some instances it is unnecessary to use a gel containing more than 40 to 50% of oxide, as sufficient viscosity reduction is obtained with gels of that concentration, and in such cases it is possible to employ gels containing as much as 10 to 20% of water in the continuous phase without diminishing the efficiency of the gel as a flatting agent to any appreciable extent.

In order to obtain a dried film of adequate smoothness it is usually necessary to grind the gel into the coating composition. This may be accomplished in various ways, but is preferably done by first preparing a so-called base grind, and then stirring the base grind into sufficient amounts of the vehicle of the coating solution to make a finished product ready for immediate use or for storage. Although grinding undried organogels into the coating composition usually results in an undesirably thickened product, the partially dried gels of this invention may be ground into the coating composition without unduly increasing the viscosity of the final mixture or solution with the result that the grinding operation itself is facilitated, higher concentrations of gels may be ground into the coating material and the product may be handled more readily, as for example in spraying operations.

A more thorough understanding of the invention will be obtained from the following examples:

*Example I*

An aquagel is first made in the following manner: Fifty-two grams of oil of vitriol of 66° Bé. concentration (93.2% $H_2SO_4$) are added to 500 grams of water, while maintaining the temperature at about 18° C. A solution of sodium silicate containing 29% $SiO_2$ is then diluted with 353 grams of water, and the resulting dilute solution is mixed with the above sulfuric acid solution with agitation and cooling. The solution is then allowed to gel, and the resulting gel is aged until full synaeresis has taken place. After ageing, the synaeresis liquor is removed and the gel is crushed to a ¾ inch average lump size. The crushed gel is then washed with water until substantially all of the sodium sulfate is removed.

The crushed and washed aquagel prepared in the above manner is covered with 95% ethyl alcohol. This alcohol and water mixture is then drained off after about seven hours and replaced with fresh 95% alcohol. This is repeated at intervals of 6 to 8 hours until the drained solvent has a density between 0.819 and 0.822 at 20° C. (about 90% $C_2H_5OH$). The resulting alcogel consists of approximately 13% silica, 78% ethyl alcohol and 9% water.

Two hundred grams of the alcogel obtained as described above are crushed, and placed in a rotary drier. The gel is tumbled in the drier, while passing a current of dry air therethrough, until the alcogel has a concentration of about 47%. This requires about six hours. Twenty-two and three-tenths grams of the above dried alcogel are then placed in a porcelain pebble mill. To this is added about 200 cubic centimeters of a lacquer having the following composition:

| | Percent by weight |
|---|---|
| Butyl acetate | 29.0 |
| Butyl alcohol | 26.4 |
| Toluene | 32.7 |
| Castor oil | 5.6 |
| ½″ nitrocellulose | 6.3 |

The resulting mixture is ground for about three hours at 72 R. P. M., which results in a smooth stable mass having a viscosity of 30 centipoises which is suitable for use as a base grind.

An exceedingly flat finished lacquer is made from the above base grind by diluting or letting down the grind with additional quantities of a lacquer having the above formulation until the mixture or solution has an $SiO_2$ content of about 15% by weight based on the film solids in the entire lacquer solution. The film obtained from this lacquer gives a reading of 8 units when tested on the Hunter glossmeter. A similar film containing 15% silica xerogel gives a reading of only 28 units.

*Example II*

A crushed and washed aquagel prepared as described in Example I is covered with commercial acetone, and allowed to stand for about seven hours. The liquid is then drained off the gel, and the gel is again flooded with fresh acetone. This procedure is repeated at intervals of 6 to 8 hours until the acetone drained off has a concentration of 97% by weight. The resulting acetone gel is composed of about 14.2% silica, 83.8% acetone and 2% water.

Two hundred grams of the acetone gel obtained as described above are crushed, and placed in a rotary drier. The gel is then dried in the manner described in Example I for a period of eight hours, which raises the silica concentration to 85.4% by weight. Six and seven-tenths grams of the above dried acetone gel are ground for about two and a half hours in a porcelain pebble mill with 300 cubic centimeters of a lacquer having the following composition:

| | Per cent by weight |
|---|---|
| Ethyl acetate | 15.0 |
| Butyl acetate | 15.0 |
| Butyl alcohol | 20.0 |
| Toluene | 23.6 |
| Rezyl 19 | 13.0 |
| Dibutyl phthalate | 4.1 |
| 6" nitrocellulose | 9.3 |

Upon completion of the grinding a finished lacquer having about 15% silica by weight based on the solids in the lacquer is obtained. The lacquer thus treated does not settle on standing and forms a very smooth film which gives a reading of 10 units when tested on the Hunter glossmeter.

*Example III*

Three hundred and eighty grams of aluminum nitrate Al(NO$_3$)$_3$·9H$_2$O are first dissolved in 1200 cubic centimeters of methyl alcohol, cooled to about $-10°$ C. and stirred vigorously while adding 280 grams of redistilled aniline. The resulting mixture is allowed to reach room temperature, at which time a firm jelly will have formed, which can be extracted with methyl alcohol until free of aniline and salts. The alcohol-aluminum hydroxide jelly or alcogel is crushed and washed with commercial diethyl ether until substantially all of the methyl alcohol has been replaced with the ether. The ether gel thus obtained is then dried in the manner described in Example I until the alumina concentration of the gel is about 70% by weight.

Twenty-two and one-half grams of the dried alumina ether gel are ground for about three hours in a porcelain pebble mill with 300 cubic centimeters of a lacquer having the following composition:

| | Per cent by weight |
|---|---|
| Butyl alcohol | 16.0 |
| Toluene | 67.5 |
| Castor oil | 2.0 |
| Dibutyl phthalate | 1.5 |
| X-low ethyl cellulose | 13.0 |

A flat finished lacquer is made from the above base grind by diluting or letting down the grind with additional quantities of a lacquer having the above formulation until the mixture or solution has an Al$_2$O$_3$ content of about 3% by weight based on the film solids in the entire lacquer solution. The film obtained from this lacquer is exceedingly smooth and is moderately flat.

*Example IV*

Eighty-two grams of stannic chloride

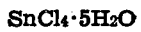

SnCl$_4$·5H$_2$O are dissolved in 200 grams of water, and placed in a dializer, such as a sack made of regenerated cellulose, as for example Cellophane, and is then suspended in 2500 cubic centimeters of distilled water. After about 24 hours the contents of the sack will have set to a firm jelly. This jelly is then washed with ethyl alcohol, until most of the water has been removed, after which the ethyl alcohol is replaced with ethyl acetate by repeated washing. The thus prepared stannic oxide-ethyl acetate organogel is crushed and dried in the manner described in Example I until the stannic oxide concentration of the gel is about 60% by weight.

Twenty-six and three tenths grams of the dried stannic oxide gel are ground for about two hours in a porcelain pebble mill with 300 cubic centimeters of a lacquer having the following composition:

| | Per cent by weight |
|---|---|
| Ethyl acetate | 30.0 |
| Acetone | 30.0 |
| Methyl Cellosolve | 15.0 |
| Santicizer 8 | 5.0 |
| M-17 | 5.0 |
| Cellulose acetate E-27 | 15.0 |

An exceedingly flat finished lacquer is made from the above base grind by diluting or letting down the grind with additional quantities of the above lacquer until the mixture or solution has an SnO$_2$ content of about 25% by weight based on the film solids in the entire lacquer solution. A smooth flat film is obtained from this lacquer.

*Example V*

Forty-four grams of magnesium nitrate

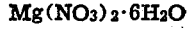

Mg(NO$_3$)$_2$·6H$_2$O are dissolved in a small amount of glycerine, and diluted to 50 cubic centimeters. Thereafter, a second solution consisting of 35 cubic centimeters of diethyl amine and 65 cubic centimeters of glycerine is floated on top of the above prepared magnesium nitrate solution. The two layers are intimately mixed by shaking, and the resulting solution allowed to set to a firm jelly. The continuous phase of the jelly, i. e. glycerine and water, is then replaced by continuous washing with acetone. The so prepared magnesia acetone gel is then washed with toluene until the acetone is substantially completely replaced with toluene. The resulting magnesia toluene gel is crushed and dried as described in Example I until the magnesia concentration of the gel is about 70% by weight.

One hundred and seven grams of the dried gel obtained as described above are ground for about six hours in a gallon size porcelain pebble mill with 1500 grams of a phenolic resin varnish made 25 gallons long with China-wood oil and reduced from its original 50% solids to about 20% solids with Solvesso #3. The resulting varnish has an MgO content of 20% by weight based on the film solids of the varnish, and forms an exceedingly smooth flat film.

*Example VI*

Eighty-three grams of chromic nitrate

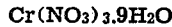

Cr(NO$_3$)$_3$·9H$_2$O are dissolved in 100 cubic centimeters of water, to which there is then added with vigorous stirring 35 grams of ammonium acetate dissolved in 50 cubic centimeters of water. The uniform mixture sets in about 5 minutes to a firm jelly. This is crushed and washed with ethyl alcohol until substantially all of the water is removed. The ethyl alcohol in the gel is then replaced by continuous washing with Solvesso No. 1, which is a mixture of petroleum spirits and aromatic spirits having a boiling range between 94 and 139° C. The resulting chromic oxide gel having Solvesso No. 1 as its continuous phase is then dried in the manner described in Example I until the chromic oxide content of the gel is about 80% by weight.

Three hundred and seventy-five grams of the dried chromic oxide gel are ground for about six hours in a gallon size porcelain pebble mill with 1000 grams of a pigmented synthetic air drying finish of the following composition:

| | Per cent by weight |
|---|---|
| Rezyl 807-1 | 52 |
| Yellow iron oxide | 17.4 |
| Medium chrome yellow | 6.7 |
| Lampblack | 2.4 |
| Solvesso No 3 | 21.1 |
| Driers | 0.4 |

The resulting synthetic resin solution has a $Cr_2O_3$ organogel content of 36% by weight based on the film solids of the resulting solution and forms a smooth exceedingly flat pigmented film.

A more thorough understanding of the effect of partially drying the organogels on the viscosity of the base grind and on the flatting efficiency of the organogel can be obtained from the following tabulation of results. In obtaining these figures the various gels tested were dried for varying periods of time. Samples were taken at definite intervals, and made up into base grind mixtures with a lacquer vehicle of the following composition:

| | Per cent by weight |
|---|---|
| Butyl acetate | 29 |
| Butyl alcohol | 26.4 |
| Toluene | 37.7 |
| Castor oil | 5.6 |
| ½" nitrocellulose | 6.3 |

The viscosities of the resulting base grinds were then measured, after which the various base grinds were let down with the same vehicle used in the preparation of the base grinds to obtain lacquers having an $SiO_2$ content of 3% and 15% respectively. The resulting lacquers were then dried to the form of a film and tested on the Hunter glossmeter:

| Type of gel dried | No. of hours dried | Percent $SiO_2$ in dried gel | Viscosity of grind in above vehicle | Lacquer film flatness in glossmeter units | |
|---|---|---|---|---|---|
| | | | | 3% $SiO_2$ in film | 15% $SiO_2$ in film |
| 7 oz. $SiO_2$/gal. | | | | | |
| "Anhydrous" alcogel: 14% $SiO_2$; 2% $H_2O$; 84% $C_{22}H_5OH$ | 0 | 14 | 44.5 | 40 | 5 |
| | 2 | 25 | 6.3 | 43 | 7 |
| | 4 | 42.5 | 1.05 | 51 | 9 |
| | 8 | 85.4 | 0.98 | 49 | 10 |
| 7 oz. $SiO_2$/gal. | | | | | |
| Commercial alcogel: 13% $SiO_2$; 9% $H_2O$; 78% $C_{22}H_5OH$ | 0 | 13 | 41.7 | 32 | 5 |
| | 2 | 25.9 | 4.3 | 41 | 3 |
| | 3 | 40.7 | 0.7 | 45 | 7 |
| | 6 | 47.3 | 0.3 | 52 | 8 |
| | 8 | 63 | 0.2 | 68 | 22 |
| | 10 | 77 | 0.2 | 67 | 21 |
| 12 oz. $SiO_2$/gal. | | | | | |
| Silica ethergel | 0 | 24.3 | 30.0 | 34 | 2 |
| | 1 | 34 | 7.2 | 37 | 3 |
| | 2 | 65 | 2.6 | 45 | 5 |
| 12 oz. $SiO_2$/gal. | | | | | |
| Commercial xerogel | | 100 | 1.06 | 60 | 28 |

Coating compositions obtained as described above and in the examples and containing the flatting agents of this invention form films which are exceedingly dull in appearance, i. e. low in specular reflection, and are admirably adapted for use on the external surfaces of aeroplanes, battleships, and the like to facilitate camouflage, and for similar uses. Clear coatings treated in accordance with this invention are free of haziness or milkiness, while pigmented coatings containing the above described flatting agents retain their original color and color value. Moreover, the films formed therefrom possess substantially the same tensile strength and resistance to brittling as untreated coatings of otherwise the same composition.

The flatting agents of this invention are also distinguished by the fact that they do not tend to increase the viscosity or the thixotropy of the coating compositions to which they are added upon being ground into them. Moreover, it is possible to employ a minimum amount of solvent in the preparation of the gels, which not only tends to conserve solvent, but renders it unnecessary to ship large amounts of solvent to the lacquer or varnish manufacturer who uses the gels.

Although the preferred method of making the organogels of the present invention involves first forming an aquagel, and then replacing the water therein with a suitable organic solvent, it is possible, as indicated in some of the examples, to form an organogel directly without going through the aquagel stage.

Reference has been made herein solely to the use of individual solvents in the preparation of the organogels. It is to be understood, however, that mixtures of these solvents may be employed, if desired, with equally good results, both in the preparation of the gels and in the flatting efficiency of the resulting gels.

It is also to be understood that when the coating compositions of this invention are prepared by first making a base grind and then letting down, the grinding medium of the base grind may have the same composition as the coating composition employed in letting down, or it may have any desired composition which is compatible with the ingredients of the let down solution and is otherwise adapted together with the let down solution to form a satisfactory finished coating composition. The base grind may also be made with any desired concentration of oxide which provides satisfactory grinding conditions.

The flattening agents of this invention have been described as applicable primarily to liquid coating compositions of all types. They may also be employed however, in the flatting of plastic compositions, such as cellulose acetate, cellulose nitrate, styrene, methacrylate and like plastic compositions, as well as in the flatting of artificial silk compositions.

The flatting agents of this invention may also be used as pigments, that is, they simultaneously act as insoluble coloring agents.

The term "Rezyl 19" is used herein to denote a glyceryl phthalate resin modified with the acid of a non-drying oil, such as cocoanut oil. The term "Rezyl 807-1" is used to denote a glyceryl phthalate resin modified with the acid of a drying oil, such as linseed oil. The term "X-low ethyl cellulose" is used to denote ethyl cellulose having an ethoxyl content of 46.8 to 48.5% and a low viscosity, i. e. of the order of 13 to 15 centipoises, when measured in the form of a 5% solution in a mixture of 80 parts of toluene and 20 parts of alcohol. The term "Santicizer 8" is used to denote a plasticizer consisting essentially of ortho and para toluene ethyl sulfonamides. The term "M-17" is used to denote the plasticizer otherwise known as methyl phthalyl ethyl glycollate. The term "cellulose acetate E 27" is used to denote cellulose acetate having a viscosity varying from 1 to 4 seconds as measured by the A. S. T. M. falling ball procedure, and an acetyl content varying from 39.6 to 40.4%. The term "Solvesso No. 3" is used to denote a hydrocarbon solvent derived by solvent extraction and distillation of a petroleum base and characterized by a boiling range of 179 to 214° C. and by a high content of aromatic constituents.

What I claim is:

1. A flat coating composition comprising a film forming liquid of a type commonly employed in varnishes, lacquers, synthetic resin solutions and the like, and a relatively minor proportion of a partially dried and substantially unshrunk organogel having organic solvent as the major portion of its liquid phase and an inorganic oxide as the solid phase, said organogel containing from 25 to 90% by weight of said inorganic oxide.

2. A flat liquid coating composition comprising a film forming liquid of a type commonly employed in varnishes, lacquers, synthetic resin solutions and the like, and a relatively minor proportion of a partially dried and substantially unshrunk silica organogel having organic solvent as the major portion of its liquid phase, said organogel containing from 25 to 90% by weight of silica.

3. A flat liquid coating composition comprising a film forming liquid of a type commonly employed in varnishes, lacquers, synthetic resin solutions and the like, and a relatively minor proportion of a partially dried and substantially unshrunk alumina organogel having organic solvent as the major portion of its liquid phase, said organogel containing from 25 to 90% by weight of alumina.

4. A flat liquid coating composition comprising a film forming liquid of a type commonly employed in varnishes, lacquers, synthetic resin solutions and the like, and a relatively minor proportion of a partially dried and substantially unshrunk iron oxide organogel having organic solvent as the major portion of its liquid phase, said organogel containing from 25 to 90% by weight of iron oxide.

5. A flat liquid coating composition comprising a lacquer and a relatively minor proportion of a partially dried and substantially unshrunk organogel having organic solvent as the major portion of its liquid phase and an inorganic oxide as the solid phase, said organogel containing from 25 to 90% by weight of said inorganic oxide.

6. A flat liquid coating composition comprising a clear varnish and a relatively minor proportion of a partially dried and substantially unshrunk organogel having organic solvent as the major portion of its liquid phase and an inorganic oxide as the solid phase, said organogel containing from 25 to 90% by weight of said inorganic oxide.

7. A flat liquid coating composition comprising a pigmented synthetic resin solution and a relatively minor proportion of a partially dried and substantially unshrunk organogel having organic solvent as the major portion of its liquid phase and an inorganic oxide as the solid phase, said organogel containing from 25 to 90% by weight of said inorganic oxide.

8. A flat liquid coating composition comprising a lacquer and a relatively minor proportion of a partially dried and substantially unshrunk silica alcogel, said alcogel containing from 25 to 90% by weight of silica.

9. A flat liquid coating composition comprising a varnish and a relatively minor proportion of a partially dried and substantially unshrunk silica toluene gel, said gel containing from 25 to 90% by weight of silica.

10. A flat liquid coating composition comprising a pigmented synthetic resin solution and a relatively minor proportion of a partially dried and substantially unshrunk silica gel having petroleum spirits as the liquid phase, said gel containing from 25 to 90% by weight of silica.

11. A flat liquid coating composition comprising a film forming liquid of a type commonly employed in varnishes, lacquers, synthetic resin solutions and the like, and a partially dried and substantially unshrunk organogel having organic solvent as the major proportion of its liquid phase and an inorganic oxide as the solid phase, said organogel containing from 25 to 90% by weight of said inorganic oxide and being present in an amount sufficient to provide from 1 to 40% by weight of said inorganic oxide based on the solids in said film forming liquid.

12. A flat liquid coating composition comprising a film forming liquid of a type commonly employed in varnishes, lacquers, synthetic resin solutions and the like, and a partially dried and substantially unshrunk silica alcogel containing from 25 to 90% by weight of silica, and said alcogel being present in an amount sufficient to provide from 1 to 30% by weight of silica based on the solids in said film forming liquid.

13. A liquid coating composition which dries to form a flat film, comprising a film forming liquid of a type commonly employed in varnishes, lacquers, synthetic resin solutions and the like, to which there has been added a partially dried and substantially unshrunk organogel having organic solvent as the major portion of its liquid phase and an inorganic oxide as the solid phase, said organogel containing from 25 to 90% by weight of said inorganic oxide and being present in an amount sufficient to provide from 1 to 40% by weight of said inorganic oxide based on the solids in said film forming liquid.

14. A liquid coating composition which dries to form a flat film, comprising a film forming liquid of a type commonly employed in varnishes, lacquers, synthetic resin solutions and the like, to which there has been added a partially dried and substantially unshrunk silica alcogel, said alcogel containing from 25 to 90% by weight of silica and being present in an amount sufficient to provide from 1 to 30% by weight of silica based on the solids in said film forming liquid.

15. A flatting composition to be added in relatively small amounts to liquid coating compositions and capable of imparting a flat finish to a film obtained therefrom comprising a ground mixture of a partially dried and substantially unshrunk organogel having organic solvent as the major portion of its liquid phase said organogel containing from 25 to 90% by weight of said inorganic oxide, and an inorganic oxide as the solid phase, and a liquid vehicle therefor which is compatible with a solvent of said coating composition.

16. A flatting composition to be added in relatively small amounts to liquid coating compositions and capable of imparting a flat finish to a film obtained therefrom comprising a ground mixture of a partially dried and substantially unshrunk silica alcogel, said alcogel containing from 25 to 90% by weight of silica, and a liquid vehicle therefor which is compatible with a solvent of said coating composition.

17. The method of flatting liquid coating compositions of the type of varnishes, lacquers, synthetic resin solutions and the like, which comprises first forming a base grind by grinding into a liquid vehicle compatible with said coating composition a partially dried and substantially unshrunk organogel having organic solvent as the major portion of its liquid phase said organogel containing from 25 to 90% by weight of said inorganic oxide and an inorganic oxide as the solid phase, and then letting down the resulting base grind with sufficient of said coating composition to provide a final coating solution having an inorganic oxide content between 1 and 40% by weight based on the solids in said final coating solution.

18. A flatting agent comprising a partially dried and substantially unshrunk organogel containing from 25 to 90% by weight of an inorganic oxide and having organic solvent as the major portion of its liquid phase, said flatting agent exerting a pigmenting action.

ANDRÉ N. LAÜS.